(12) United States Patent
Cho

(10) Patent No.: US 7,278,877 B2
(45) Date of Patent: Oct. 9, 2007

(54) CONNECTOR ASSEMBLY FOR CONNECTING MOBILE PHONE TO PERIPHERAL DEVICE

(75) Inventor: Min-Won Cho, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/444,781

(22) Filed: Jun. 1, 2006

(65) Prior Publication Data

US 2006/0293080 A1    Dec. 28, 2006

(30) Foreign Application Priority Data

Jun. 2, 2005    (KR) .................. 10-2005-0047433

(51) Int. Cl.
*H01R 11/00* (2006.01)
(52) U.S. Cl. ........................................... 439/502
(58) Field of Classification Search ............ 439/502, 439/528, 135, 134
See application file for complete search history.

(56) References Cited

U.S. PATENT DOCUMENTS

| 5,236,366 | A | 8/1993 | Deak et al. | |
| 5,885,109 | A | 3/1999 | Lee et al. | |
| 6,290,530 | B1 | 9/2001 | Chang | |
| 6,589,069 | B1* | 7/2003 | Liao | 439/501 |
| 6,663,420 | B1 | 12/2003 | Xiao | |
| 2003/0224637 | A1* | 12/2003 | Ling | 439/133 |
| 2005/0255743 | A1* | 11/2005 | Lin | 439/502 |
| 2006/0252305 | A1* | 11/2006 | Le et al. | 439/528 |

FOREIGN PATENT DOCUMENTS

| EP | 1 061 607 | 12/2000 |
| JP | 2001-319745 | 11/2001 |
| JP | 2002-170643 | 6/2002 |
| JP | 2003-233440 | 8/2003 |
| WO | WO 02/17460 | 2/2002 |
| WO | WO 2003/043296 | 5/2003 |
| WO | WO 2005/013456 | 2/2005 |

* cited by examiner

*Primary Examiner*—Phuong Dinh
(74) *Attorney, Agent, or Firm*—The Farrell Law Firm

(57) ABSTRACT

A connector assembly having two connector terminals linked by a short cable to reduce the overall size thereof. The connector assembly is used to connect a mobile phone to a peripheral device and has a structure including a cable; a first connector terminal provided at one end of the cable to be connected to the peripheral device; and a second connector terminal detachable from the first connector terminal, electrically connected to a plug connector provided at the other end of the cable and having an interface connector that can be plugged into an interface terminal provided on the mobile phone.

17 Claims, 24 Drawing Sheets

CONNECTOR ASSEMBLY FOR CONNECTING MOBILE PHONE TO PERIPHERAL DEVICE

PRIORITY

This application claims priority to an application entitled "Connector Assembly For Connecting Mobile Phone To Peripheral Device" filed with the Korean Intellectual Property Office on Jun. 2, 2005 and assigned Serial No. 2005-47433, the contents of which are incorporated herein by reference.

BACKGROUND OF THE INVENTION

1. Field of the Invention

The present invention relates to a connector assembly for connecting a mobile phone to a peripheral device, and more particularly to a connector assembly for connecting a mobile phone to a peripheral device and having two connectors linked by a short cable to reduce the overall size of the connector assembly, thereby improving portability.

2. Description of the Related Art

Generally, mobile phones or terminals refer to handheld devices used for data transmission or wireless communication while the user is moving. It is a current trend that mobile phones are becoming smaller, sleeker and lighter to improve portability and multifunctional to implement broader functions and services.

Mobile phones have an interface terminal, generally at the bottom thereof, for purposes of multimedia processing and battery charging. A mobile phone can be connected to a peripheral device using a separate connector means plugged into the interface terminal.

As illustrated in FIGS. 1 and 2, a conventional connector means is a cable 10 having an interface connector 20 at one end thereof and a Universal Serial Bus (USB) jack 30 or a small-sized adapter with a charger circuit. The cable is used to connect a mobile phone to a peripheral device (not shown) such as a PC or a printer, or to charge the battery.

Typically, different models of mobile phones have different types or shapes of interface terminals. When users buy a different or new model mobile phone, they also have to buy a new connector means that fits with that model. As a solution to this problem, mobile phone connection standards recommend that a 24-pin connector be used for the interface terminal and the connector means for battery charging and data communication.

Conventional connector means have a cable structure connecting the interface connector and the USB jack. The length of the cable increases the size of the connector means and thereby reduces the portability. Also, a separate case is needed to contain the connector means when traveling, which increases the price of the connector means. Since most conventional connector means are configured only to charge the mobile phone battery or to perform data transmission, another connector is necessary to connect a mobile phone to a peripheral device, such as a PC or a printer. Also, the mobile phone should be provided with another interface terminal for connection to a peripheral device.

SUMMARY OF THE INVENTION

Accordingly, the present invention has been made to solve the above-mentioned problems occurring in the prior art, and an object of the present invention is to provide a connector assembly having two connector terminals linked by a short cable to reduce the overall size and used to connect a mobile phone to a peripheral device. The connector assembly can be hung on the mobile phone while not in use, thereby improving portability.

Another object of the present invention is to provide a connector assembly with improved portability due to a structure having two connector terminals detachable from each other and providing convenience in connecting a mobile phone to a peripheral device (such as a Bluetooth embedded device, memory device or speaker device) for data transmission.

Still another object of the present invention is to provide a connector assembly having a plurality of connector terminals each having an interface connector, which can connect one mobile phone to another with a lower power level to charge the battery of the other mobile phone and display the amount of charge.

Still another object of the present invention is to provide a small-sized connector assembly for connecting a mobile phone to a peripheral device, which can be used as a hand strap or a decorative accessory for the mobile phone due to its improved portability.

In accordance with a first aspect of the present invention for accomplishing the above objects, there is provided a connector assembly for connecting a mobile phone to a peripheral device, including a cable; a first connector terminal provided at one end of the cable to be connected to the peripheral device; and a second connector terminal detachable from the first connector terminal, electrically connected to a plug connector provided at the other end of the cable and having an interface connector that can be plugged into an interface terminal provided on the mobile phone.

In accordance with a second aspect of the present invention, there is provided a connector assembly for connecting a mobile phone to a peripheral device, including a cable; a first connector terminal provided at one end of the cable to be connected to the peripheral device; a second connector terminal detachable from the first connector terminal, electrically connected to a plug connector provided at the other end of the cable and having an interface connector that can be plugged into an interface terminal provided on the mobile phone; and a locking means for locking the second connector terminal to the first connector terminal.

In accordance with a third aspect of the present invention, there is provided a connector assembly for connecting a mobile phone to a peripheral device, including a cable; a connector terminal provided at one end of the cable to be connected to the peripheral device; and an interface connector terminal provided at the other end of the cable and directly plugged into an interface terminal provided on the mobile phone.

In accordance with a fourth aspect of the present invention, there is provided a connector assembly for connecting a mobile phone to a peripheral device, including a cable; a first connector terminal provided at one end of the cable and having an interface connector plugged into an interface terminal provided on the mobile phone; and a second connector terminal detachable from the first connector terminal, electrically connected to a plug connector provided at the other end of the cable and having an interface connector plugged into an interface terminal provided to another mobile phone.

In accordance with a fifth aspect of the present invention, there is provided a connector assembly for connecting a mobile phone to a peripheral device, including a cable; a first connector terminal provided at one end of the cable and having an interface connector plugged into an interface terminal provided on the mobile phone; a second connector terminal detachable from the first connector terminal, electrically connected to a plug connector provided at the other end of the cable and having an interface connector plugged into an interface terminal provided to another mobile phone; and a display unit provided on the second connector terminal to display a battery charge amount when charging the battery.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
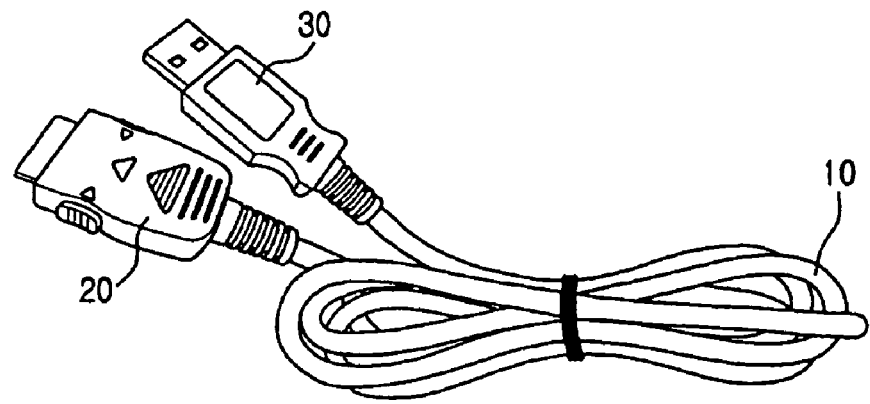
FIG. 1 is a perspective view of a conventional connector assembly for connecting a mobile phone to a peripheral device.
Figure 2:
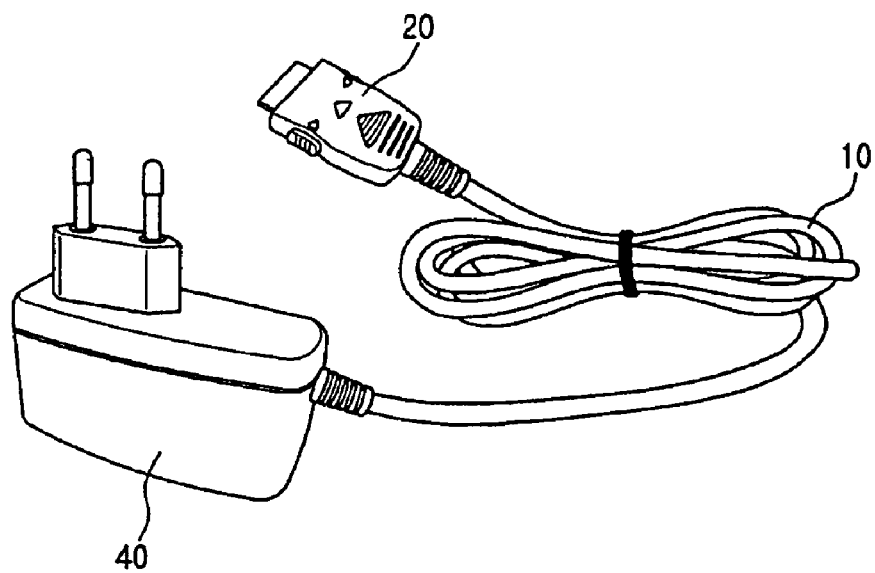
FIG. 2 is a perspective view of a conventional connector assembly for charging the battery of a mobile phone.

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention unclear.

A connector assembly according to the first embodiment of the present invention will be explained in detail with reference to FIGS. 3 to 7.

Figure 3:
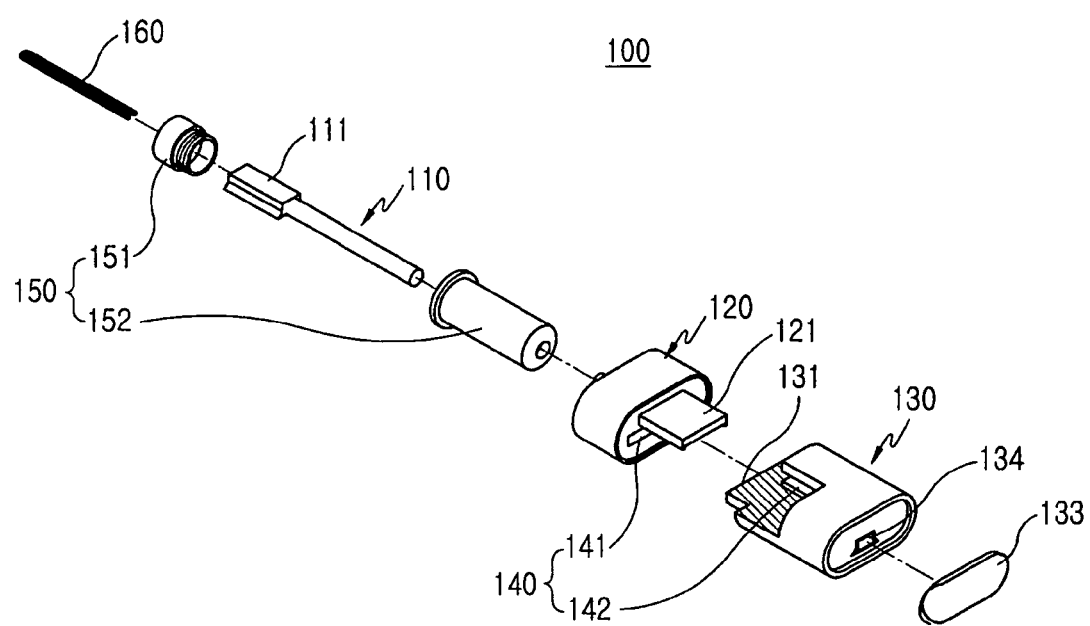
FIG. 3 is an exploded perspective view of the connector assembly according to a first embodiment of the present invention.
Figure 7:
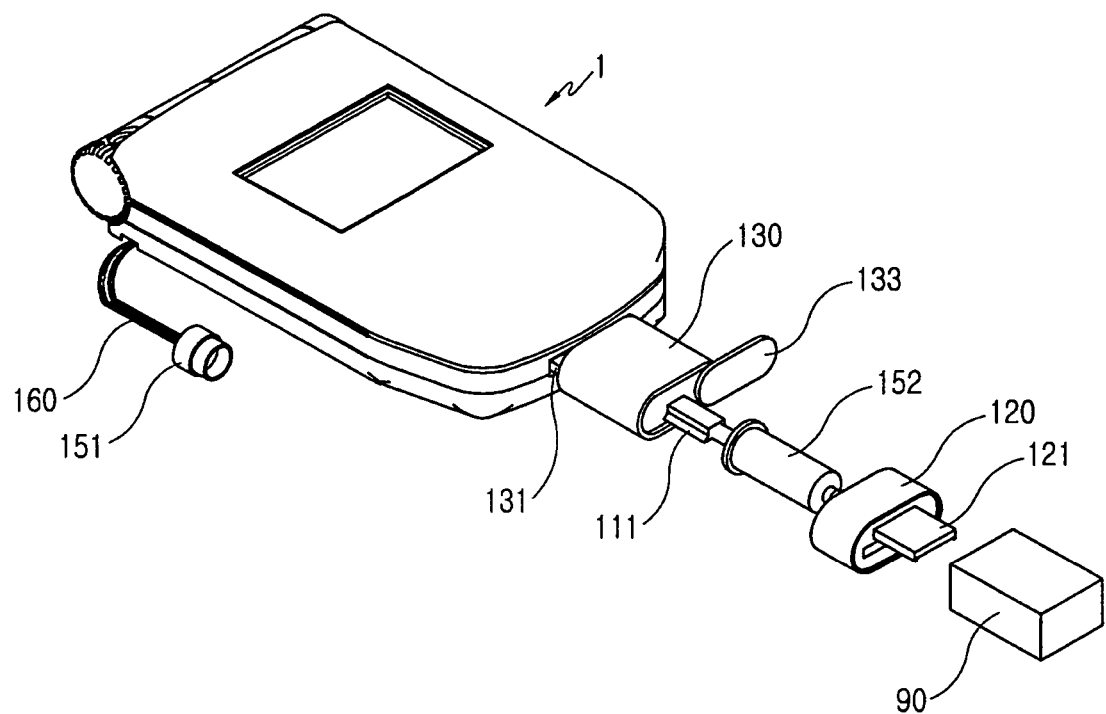
FIG. 7 is a perspective view illustrating the connection between a mobile phone and a peripheral device using the connector assembly according to the first embodiment of the present invention.

Referring to FIG. 3, the connector assembly 100 comprises a cable 110, a first connector terminal 120 and a second connector terminal 130. The cable 110 is as short as possible to reduce the distance between the first connector terminal 120 and the second connector terminal 130 when arranged to connect a mobile phone 1 to a peripheral device 90 (FIG. 7). The first connector terminal 120 is provided at one end of the cable 110 to be connected to the peripheral device 90. The second connector terminal 130 is detachable from the first connector terminal 120. A plug connector 111, provided at the other end of the cable 110, can be electrically connected to the second connector terminal 130. The second connector terminal 130 with the plug connector 111 connected can be inserted into an interface terminal 1a (FIG. 4) provided on the mobile phone 1. As shown in FIG. 7, an interface conductor 131 of the second connector terminal 130 is electrically connected to the interface terminal 1a of the mobile phone 1.

Figure 5:
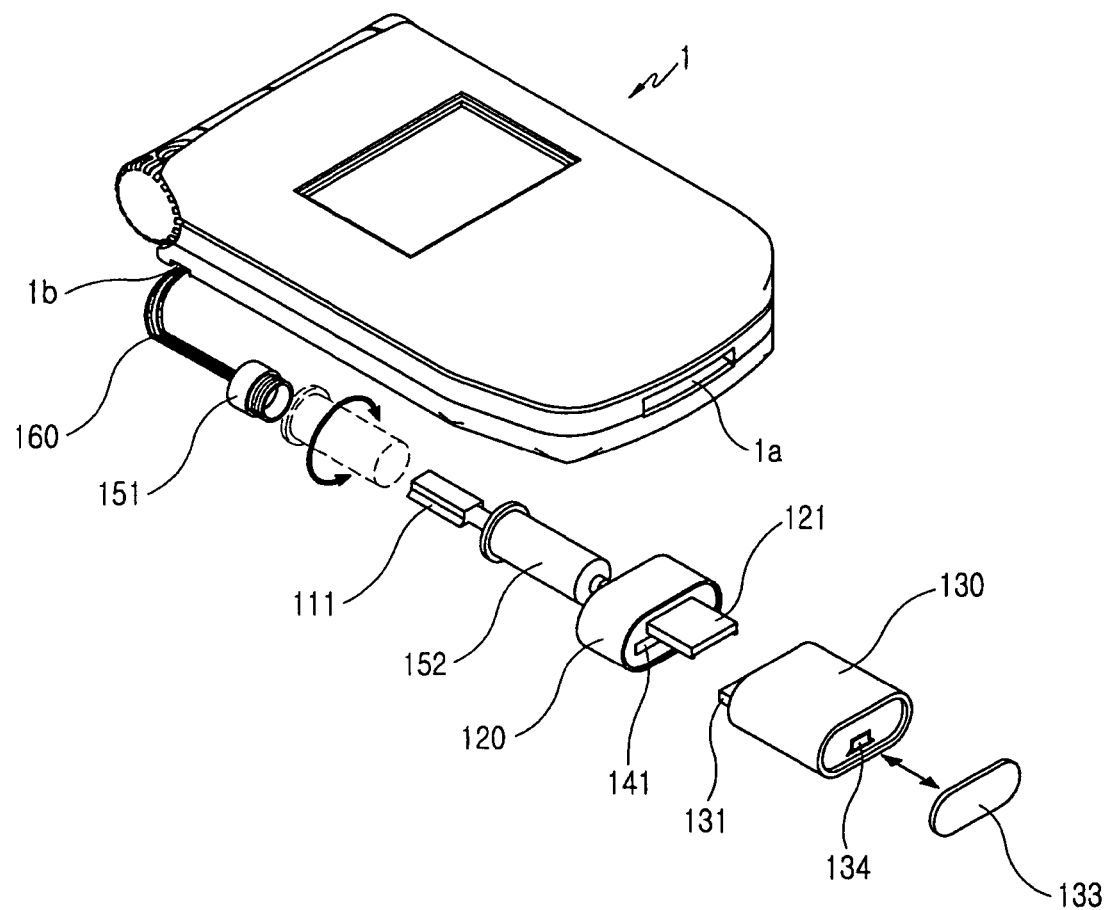
FIG. 5 is a perspective view illustrating the connector assembly disassembled to be used according to the first embodiment of the present invention.
Figure 6:
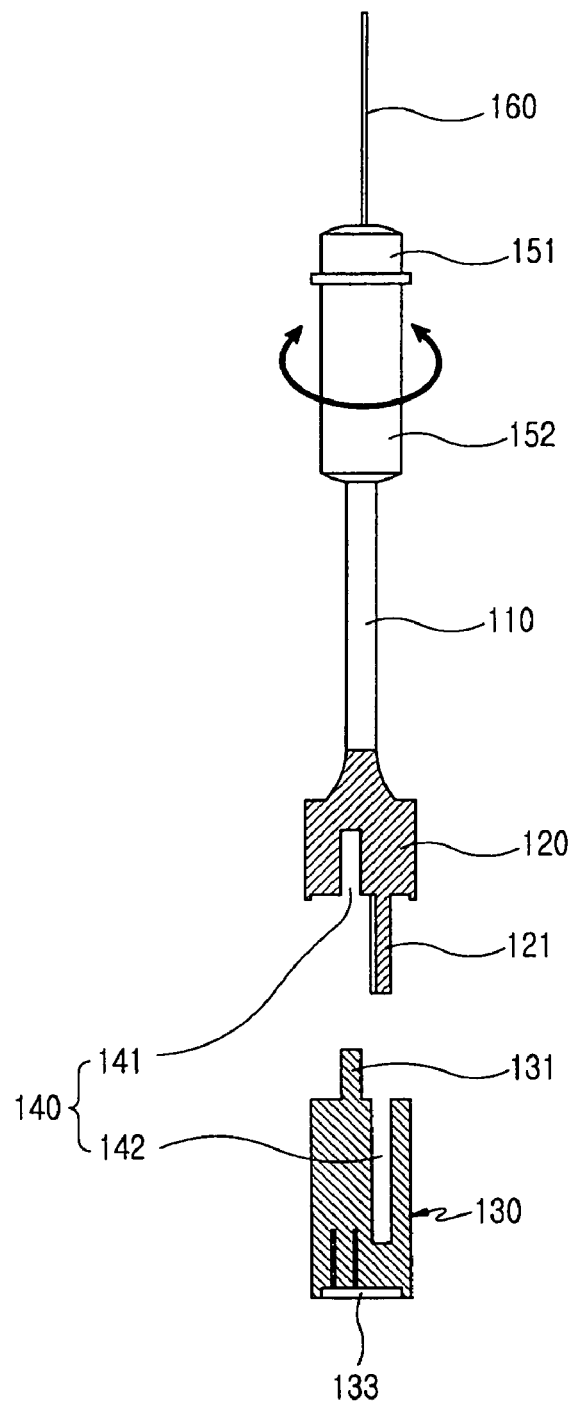
FIG. 6 is a side cross-sectional view illustrating the connector assembly disassembled to be used according to the first embodiment of the present invention.

Referring to FIGS. 5 through 7, the first connector terminal 120 and the second connector terminal 130 have a connection means 140 for securing the second connector terminal 130 to the first connector terminal 120. The connection means 140 includes first and second slots 141 and 142. The interface connector 131 of the second connector terminal 130 is fitted into the first slot 141 formed on the first connector terminal 120. As illustrated in FIG. 7, the first connector terminal 120 has a USB jack 121 which can be electrically connected to the peripheral device 90 (for example, a Bluetooth embedded device, a memory device or a speaker device). The USB jack 121 is fitted into or removed from the second slot 142 formed on the second connector terminal 130 according to the insertion or removal of the interface connector 131 into or removed from the first slot 141.

The interface connector 131 is preferably a 24-pin connector. The plug connector 111 is preferably a 10-pin connector.

As illustrated in FIG. 5, the second connector terminal 130 has the interface connector 131 at one end thereof to be inserted into the interface terminal 1a provided on the mobile phone 1. Also, the second connector terminal 130 has a receptacle connector 134 to which the plug connector 111 of the cable 110 can be electrically connected and a cover 133 for closing or opening the receptacle connector 134.

Figure 4:
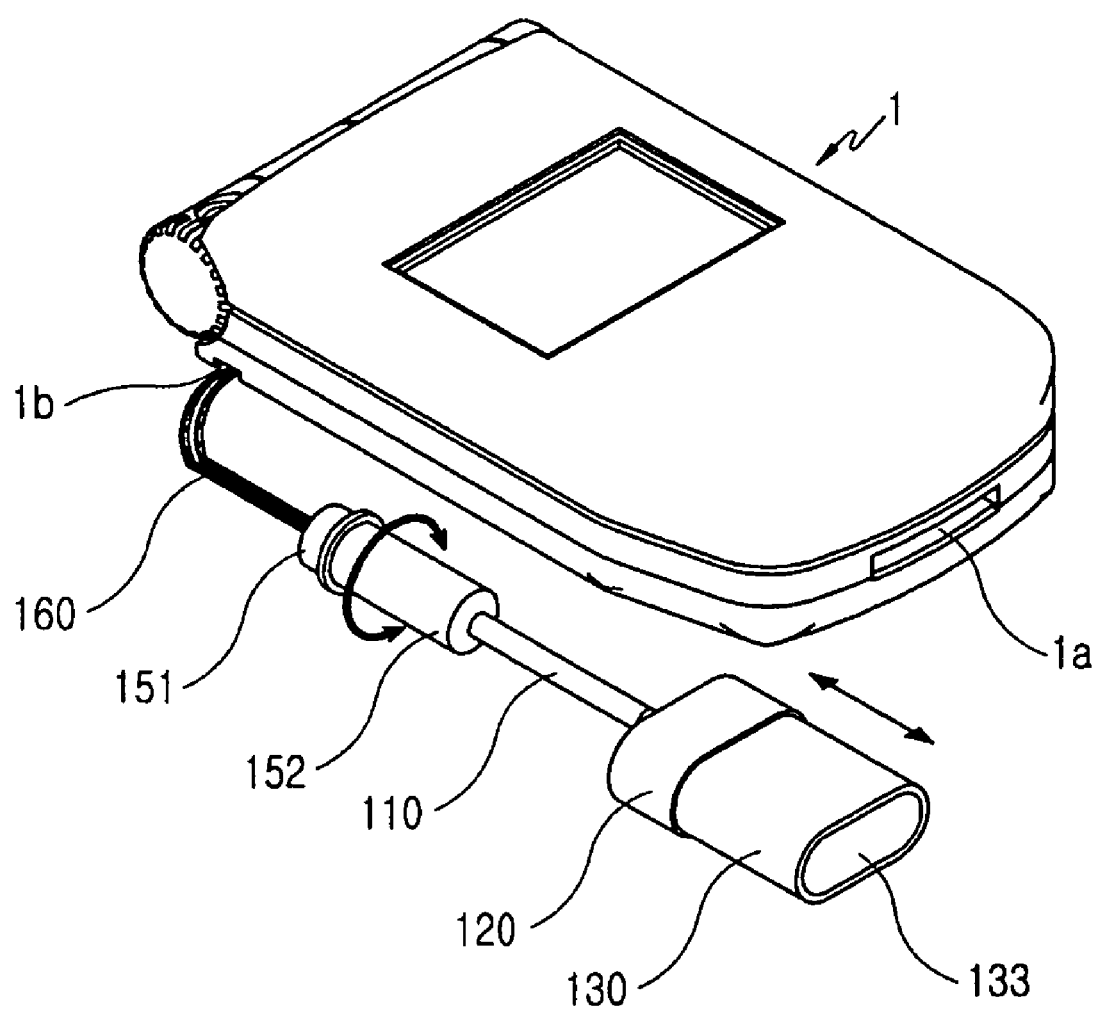
FIG. 4 is a perspective view illustrating the connector assembly hung on a mobile phone according to the first embodiment of the present invention.

As illustrated in FIGS. 3 and 4, a protective case 150 is provided to protect the plug connector 111 from an external impact. The protective case 150 consists of a first case 151 and a second case 152 which is screwed onto the first case 151. The second case 152 has a receiving space for accommodating the plug connector 111 therein and screw threads to be engaged with the first case 151. As illustrated in FIG. 4, the first case 151 is fixed to a wire strap 160 hung on a loop 1b provided on the mobile phone 1.

Hereinafter, the structure of the connector assembly for connecting a mobile phone to a peripheral device according to the first embodiment of the present invention will be explained in more detail with reference to FIGS. 3 to 7.

Referring to FIGS. 3 and 4, the connector assembly 100 includes the short cable 110, the first connector terminal 120 provided at one end of the cable 110 to be connected to the peripheral device 90 and the second connector terminal 130 having the receptacle connector 134 to which the plug connector 111 provided at the other end of the cable 110 can be electrically connected.

As illustrated in FIG. 5, the plug connector 111 is received within the protective case 150. The protective case 150 consists of the first case 151 and the second case 152 screwed to the first case 151. The first case 151 is fixed to the wire strap 160 which can be hung on the loop 1b of the mobile phone 1.

In order to establish a connection between the mobile phone 1 and the peripheral device 90, the second case 152 should be unscrewed and separated from the first case 151. At this time, the first case 151 is still fixed to the mobile phone 1 due to the wire strap 160 hung on the loop 1b. The plug connector 111 can be pulled out from the receiving space of the second case 152.

As illustrated in FIG. 6, the second connector terminal 130 may be separated from the first connector terminal 120 provided at one end of the cable 110.

As illustrated in FIGS. 3 and 5, the interface connector 131 of the second connector terminal 130 is pulled out from the first slot 141 of the first connector terminal 120. At the same time, the USB jack 121 of the first connector terminal 120 is released from the second slot 142 of the second connector terminal 130.

As illustrated in FIG. 7, the plug connector 111 is electrically connected to the receptacle connector 134 (FIG. 5). Also, the interface connector 131 of the second connector terminal 130 is plugged into the interface terminal 1a provided on the mobile phone 1. In this condition, the USB jack 121 of the first connector terminal 120 is connected to the peripheral device 90 (for example, a Bluetooth embedded device, a memory device or a speaker device).

To terminate the connection between the mobile phone 1 and the peripheral device 90, the USB jack 121 of the first connector terminal 120 should be separated from the peripheral device 90. The plug connector 111 is pulled out from the receptacle connector 134 of the second connector terminal 130.

As illustrated in FIG. 5, the second connector terminal 130, separated from the interface terminal 1a of the mobile phone 1, may be connected again to the first connector terminal 120. At this time, the interface connector 131 is fitted into the first slot 141 of the first connector terminal 120 and the USB jack 121 of the first connector terminal 120 into the second slot 142 of the second connector terminal 130.

The bottom of the second connector terminal 130 is closed with the cover 133 to protect the receptacle connector 134. The second case 152 is moved up to receive the plug connector 111 therein and then screwed up to the first case 151 fixed to the mobile phone 1. The connector assembly 100 can be used as a hand strap or a decorative accessory for the mobile phone 1.

Hereinafter, the structure of a connector assembly for connecting a mobile phone to a peripheral device according to the second embodiment of the present invention will be explained in detail with reference to FIGS. 8 to 15.

Figure 8:
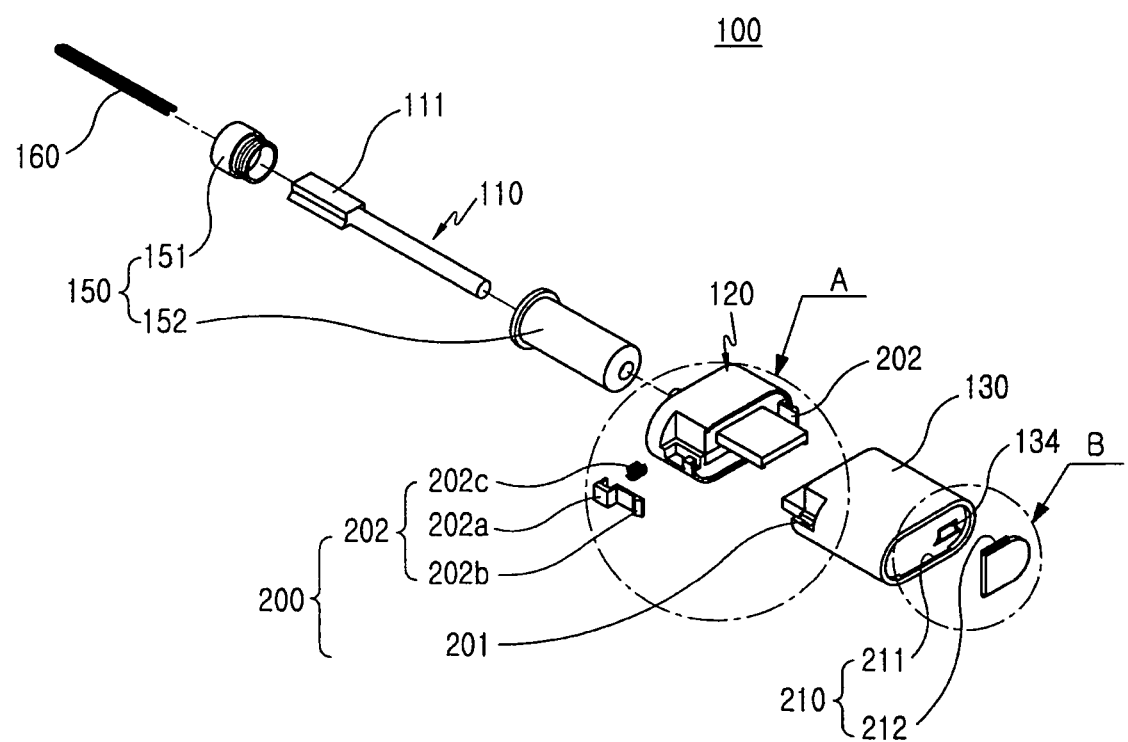
FIG. 8 is an exploded perspective view of a connector assembly according to a second embodiment of the present invention.
Figure 9:
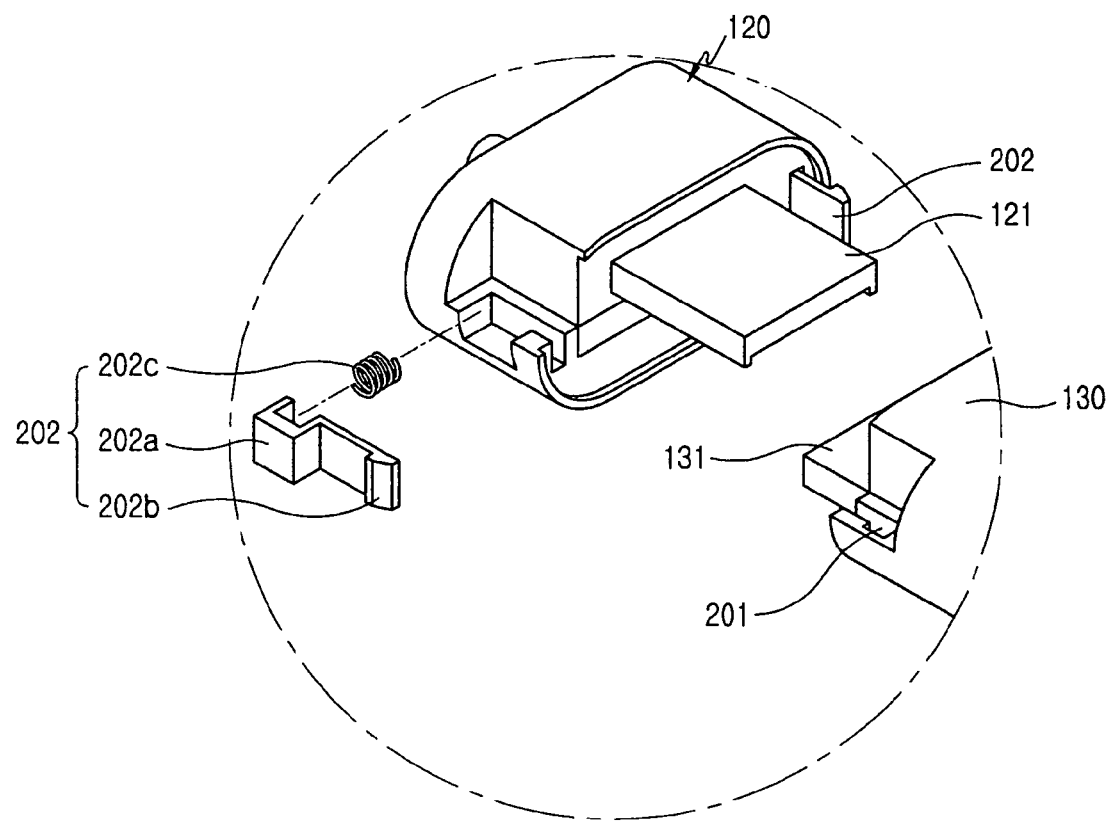
FIG. 9 is an enlarged exploded perspective view of part A in FIG. 8.

Referring to FIGS. 8 and 9, the connector assembly 100 includes a short cable 110, a first connector terminal 120 provided at one end of the cable 110 to be connected to a peripheral device 90 (FIG. 13) and a second connector terminal 130 having a receptacle connector 134 to which a plug connector 111 provided at the other end of the cable 110 can be electrically connected.

As illustrated in FIGS. 8 and 9, a pair of locking means 200 are provided on the first and second connector terminals 120 and 130 in order to lock the second connector terminal 130 to the first connector terminal 120 with the pressing of a pair of buttons 202a.

Figure 11:
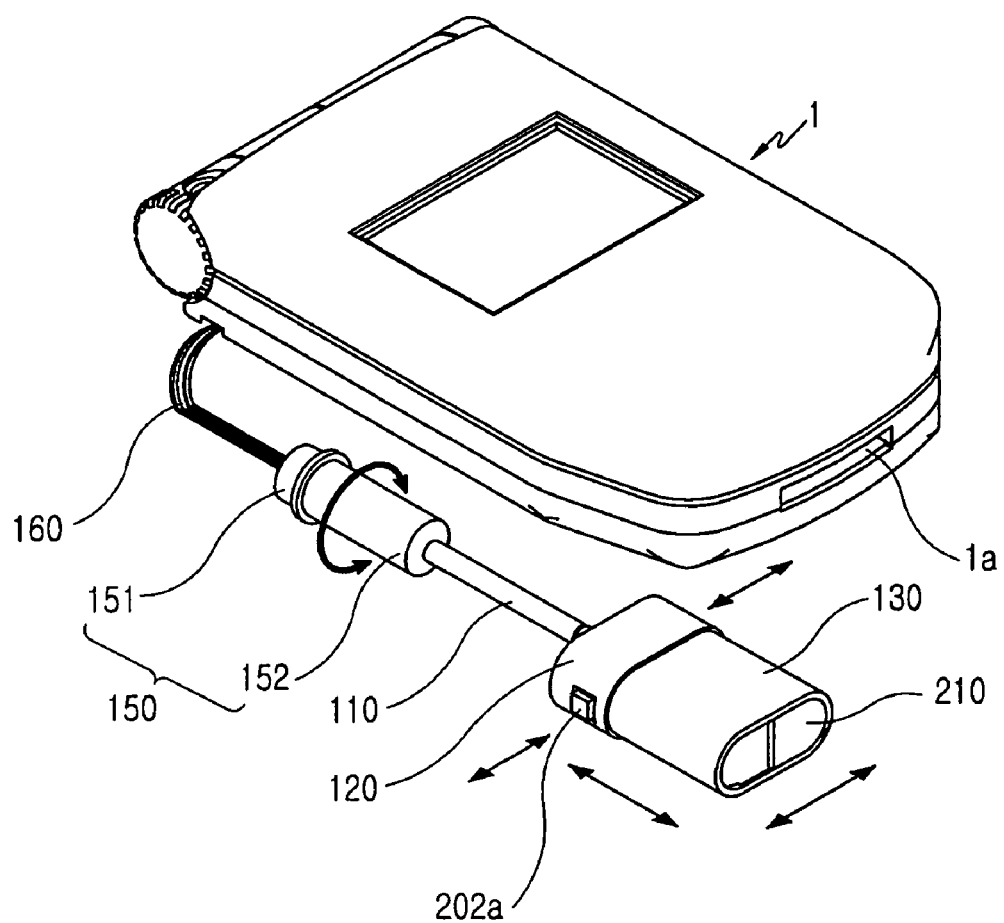
FIG. 11 is a perspective view illustrating the connector assembly hung on a mobile phone according to the second embodiment of the present invention.
Figure 12:
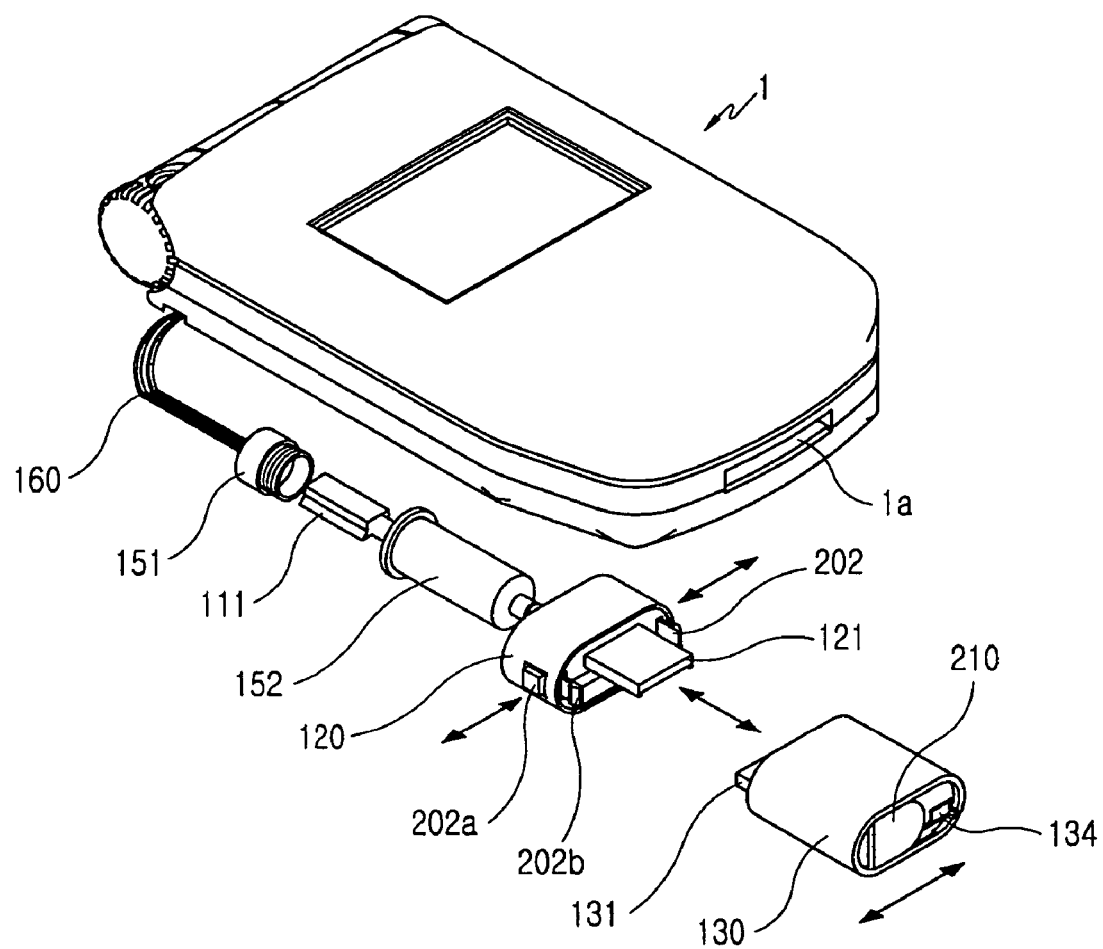
FIG. 12 is a perspective view illustrating the connector assembly disassembled to be used according to the second embodiment of the present invention.

As illustrated in FIGS. 11 and 12, the plug connector 111 is received within a protective case 150. The protective case 150 is composed of a first case 151 and a second case 152 screwed to the first case 151. The first case 151 is fixed to a wire strap 160 which can be hung on the loop 1b of the mobile phone 1. In order to establish a connection between the mobile phone 1 and the peripheral device 90, the second case 152 should be unscrewed and separated from the first case 151 as illustrated in FIG. 12. At this time, the first case 151 is still fixed to the mobile phone 1 due to the wire strap 160 hung on the loop 1b. The plug connector 111 can be pulled out from the receiving space of the second case 152.

As illustrated in FIGS. 11 and 12, when the buttons 202a provided on both sides of the first connector terminal 120 are pressed, they move into the first connector terminal 120 and cause a pair of lockers 202 extending from the respective buttons 202a to move inside and be released from a pair of locking recesses 201 (FIG. 14) formed on the inside of the second connector terminal 130.

Figure 14:
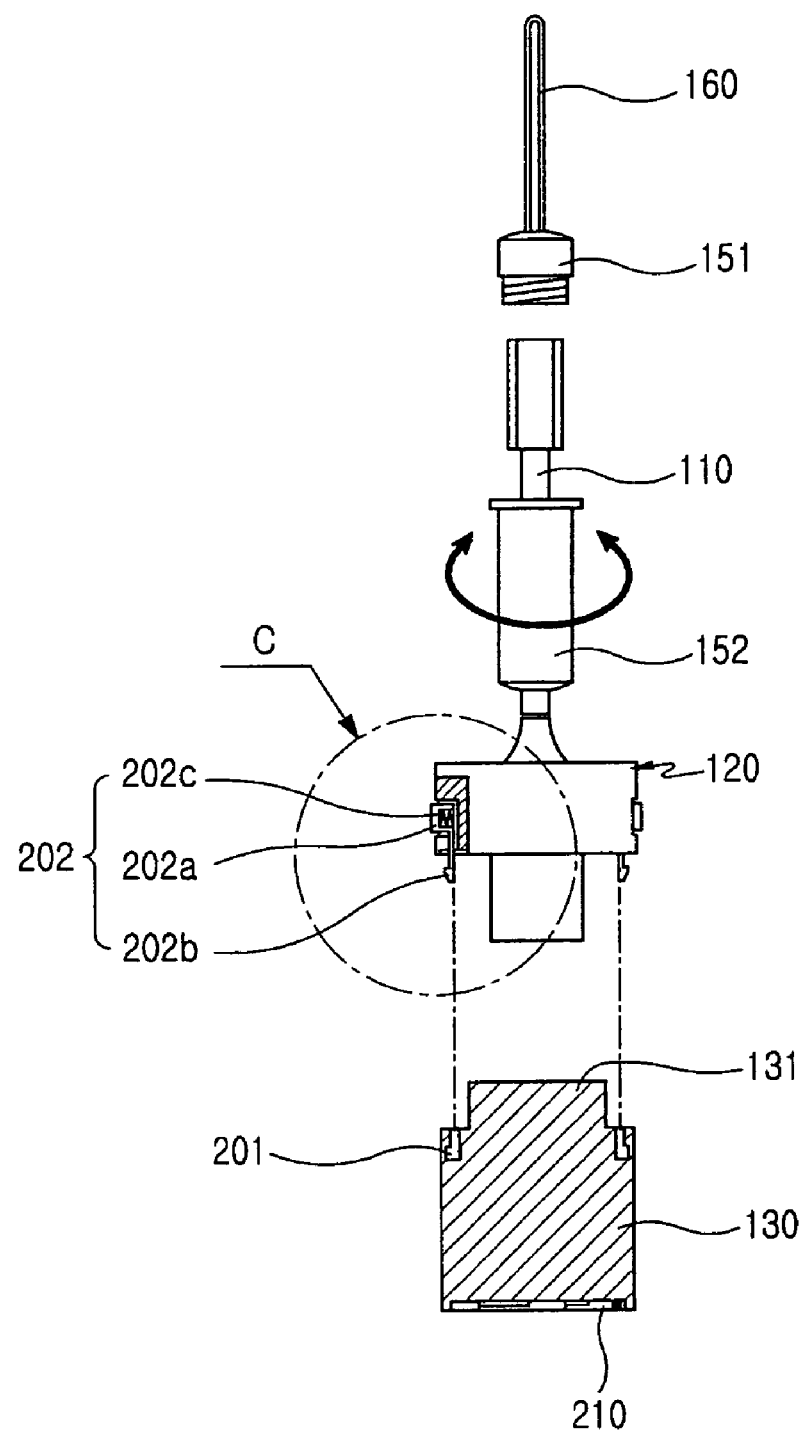
FIG. 14 is a side cross-sectional view of the connector assembly according to the second embodiment of the present invention.

Specifically, locking projections 202b of the lockers 202 move back with the pressing of the buttons 202a and are thus released out from the locking recesses 201 (FIG. 14). As a result, the second connector terminal 130 is separated from the first connector terminal 120 provided at one end of the cable 110.

At this time, the interface connector 131 of the second connector terminal 130 is pulled out from the first slot 141 (not shown) of the first connector terminal 120. Also, the USB jack 121 of the first connector terminal 120 is released from the second slot 142 (not shown) of the second connector terminal 130.

As illustrated in FIG. 12, a cover 210 provided on the bottom of the second connector terminal 130 can be slidingly moved to open the receptacle connector 134 of the second connector terminal 130.

Figure 10:
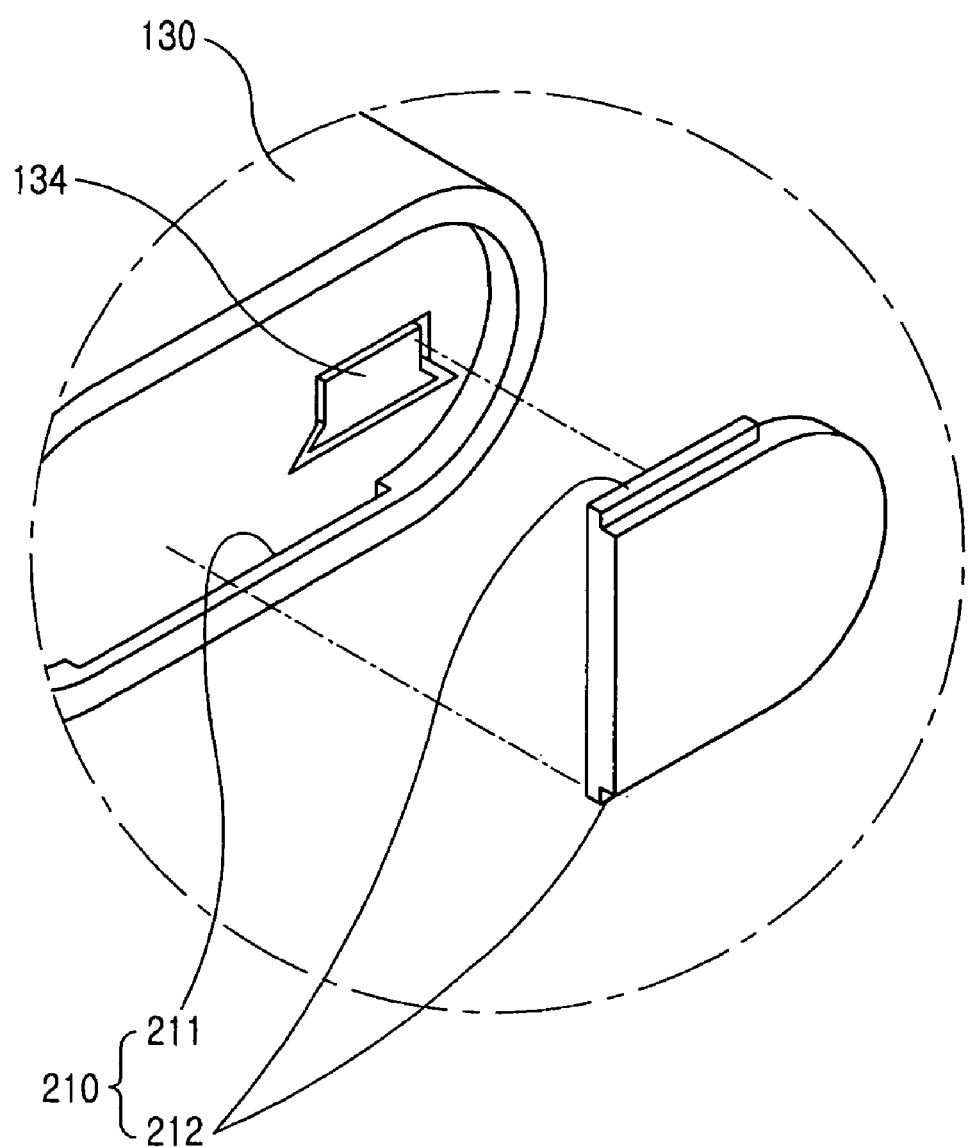
FIG. 10 is an enlarged exploded perspective view of part B in FIG. 8.
Figure 13:
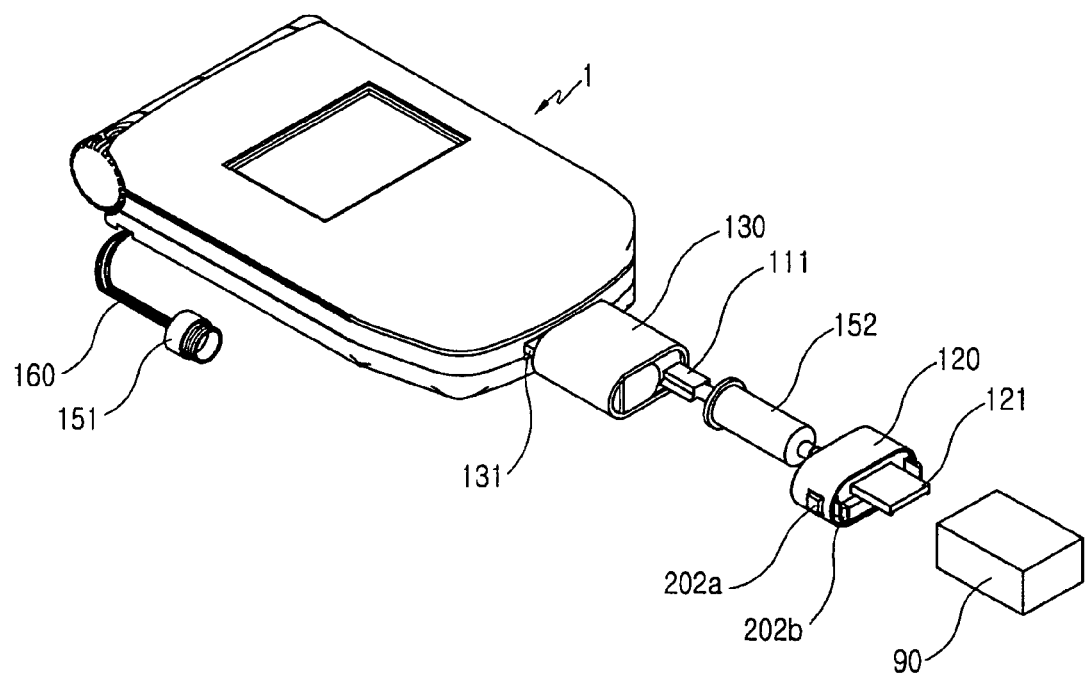
FIG. 13 is a perspective view illustrating the connection between a mobile phone and a peripheral device using the connector assembly according to the second embodiment of the present invention.

As illustrated in FIG. 10, the cover 210 has a pair of guide members 212 formed at side edges thereof. The guide members 212 are inserted into a corresponding pair of guide grooves 211 linearly formed at side edges of the bottom of the second connector terminal 130. When the sliding cover 210 is moved back to open the receptacle connector 134, the guide members 212 slide along the guide grooves 211. Then, the plug connector 111 can be electrically connected to the receptacle connector 134 (FIG. 13). Also, the interface connector 131 of the second connector terminal 130 is plugged into the interface terminal 1a provided on the mobile phone 1.

In this condition, the USB jack 121 of the first connector terminal 120 is connected to the peripheral device 90 (for example, a Bluetooth embedded device, a memory device or a speaker device) as illustrated in FIG. 13.

To terminate the connection between the mobile phone 1 and the peripheral device 90, the USB jack 121 of the first connector terminal 120 should be separated from the peripheral device 90. The plug connector 111 is pulled out from the receptacle connector 134 of the second connector terminal 130. The sliding cover 210 is moved to close the receptacle connector 134.

The second connector terminal 130 separated from the interface terminal 1a of the mobile phone 1 is connected again to the first connector terminal 120. The interface connector 131 is then fitted into the first slot 141 of the first connector terminal 120 and the USB jack 121 of the first connector terminal 120 into the second slot 142 of the second connector terminal 130.

Figure 15:
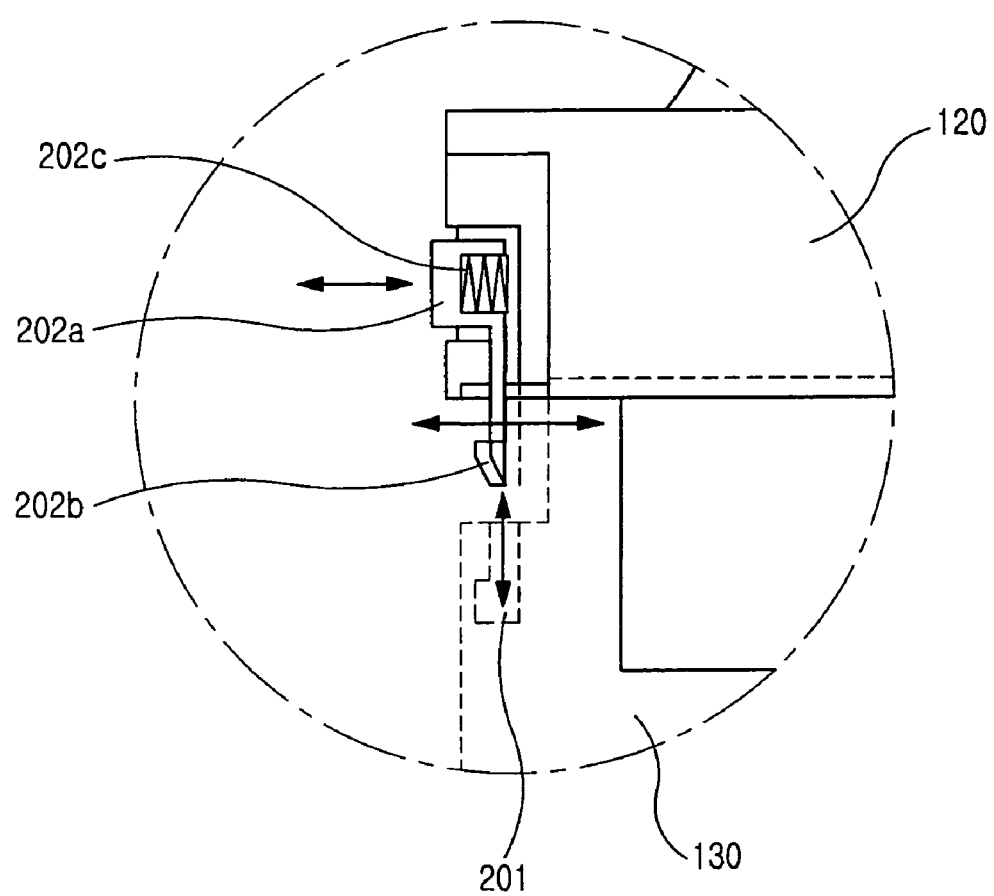
FIG. 15 is an enlarged side view of part C in FIG. 14.

As illustrated in FIGS. 14 and 15, the locking recesses 201 are fitted to the corresponding lockers 202 formed on the first connector terminal 120 so that the locking projections 202b can be inserted into the locking recesses 201. An elastic member 202c is mounted on the rear side of each button 202a. Due to the elastic force generated from the elastic member 202c, the locking projections 202b can be secured in the locking recesses 201 until and unless the buttons 202a are pressed. Lastly, the second case 152 is moved up to receive the plug connector 111 therein and then screwed up to the first case 151 fixed to the mobile phone 1.

Figure 19:
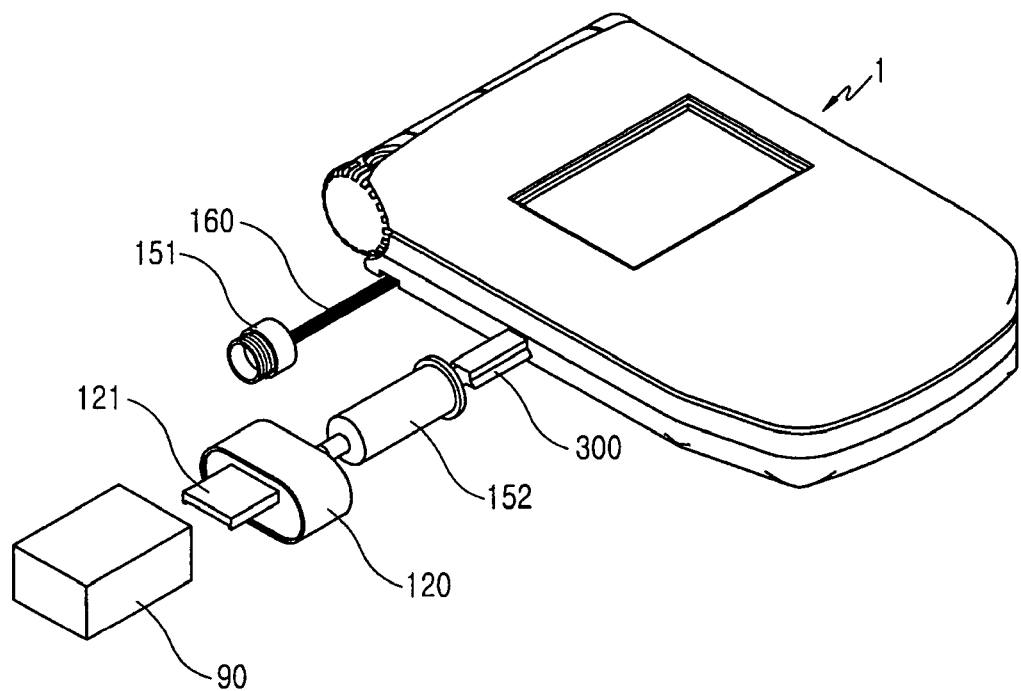
FIG. 19 is a perspective view illustrating the connector assembly after connection between a mobile phone and a peripheral device according to the third embodiment of the present invention.

Hereinafter, the structure of a connector assembly for connecting a mobile phone to a peripheral device according to the third embodiment of the present invention will be explained in detail with reference to FIGS. 16 and 19.

Figure 16:
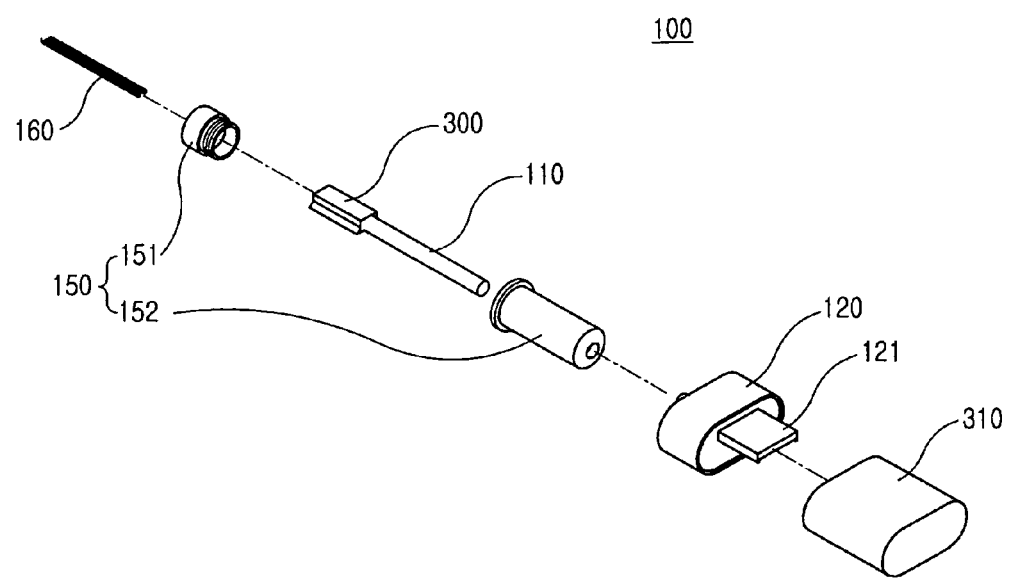
FIG. 16 is an exploded perspective view of a connector assembly according to a third embodiment of the present invention.

Referring to FIG. 16, the connector assembly 100 includes a short cable 110, a connector terminal 120 provided at one end of the cable 110 to be connected to a peripheral device 90 and an interface connector terminal 300 provided at the other end of the cable 110 and directly plugged into an interface terminal 1a provided on the mobile phone 1.

The interface connector terminal 300 is received within a protective case 150. The protective case 150 is composed of a first case 151 and a second case 152 screwed to the first case 151.

Figure 17:
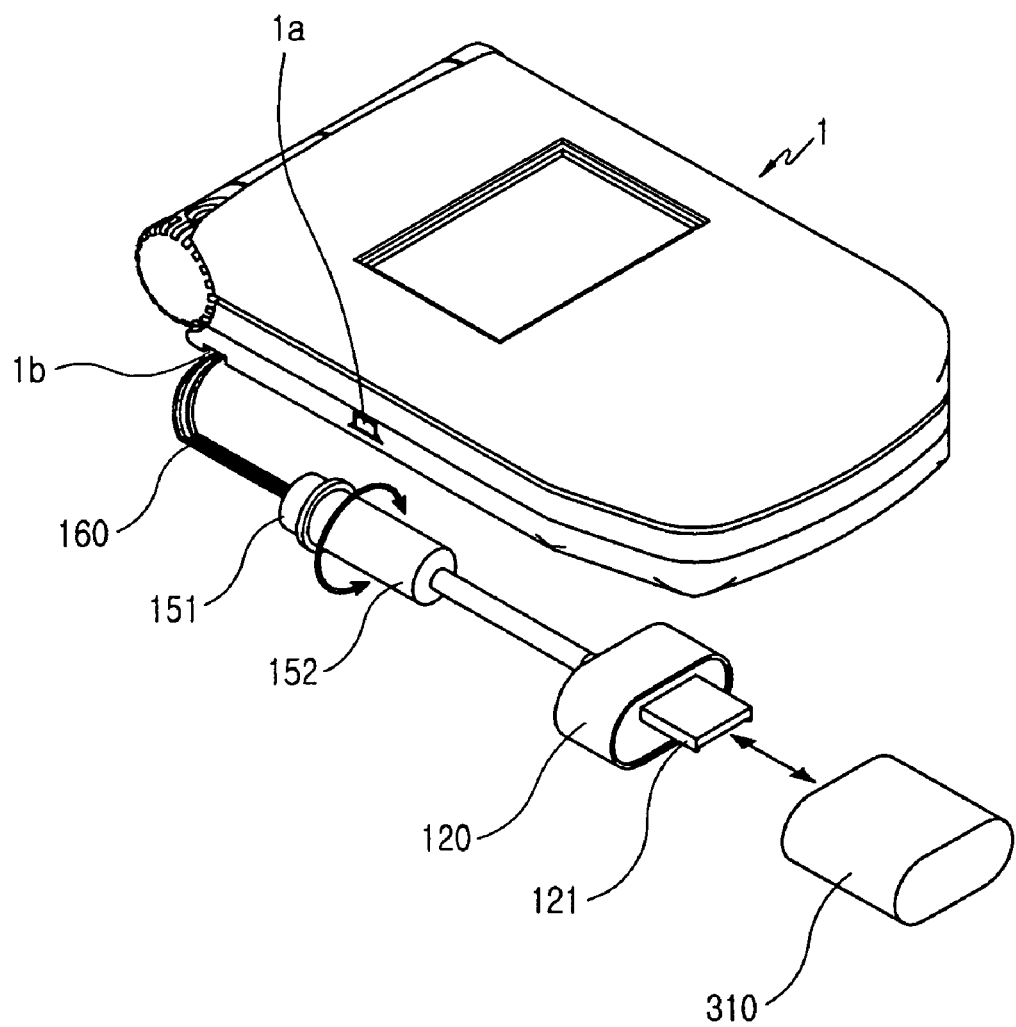
FIG. 17 is a perspective view illustrating the connector assembly hung on a mobile phone according to the third embodiment of the present invention.

As illustrated in FIG. 17, the first case 151 of the protective case 150 is fixed to a wire strap 160 which can be hung on the loop 1b of the mobile phone 1.

In order to establish a connection between the mobile phone 1 and the peripheral device 90, the second case 152 is unscrewed and separated from the first case 151.

At this time, the first case 151 is still fixed to the mobile phone 1 due to the wire strap 160 hung on the loop 1b. The interface connector terminal 300 can be pulled out from the receiving space of the second case 152.

Figure 18:
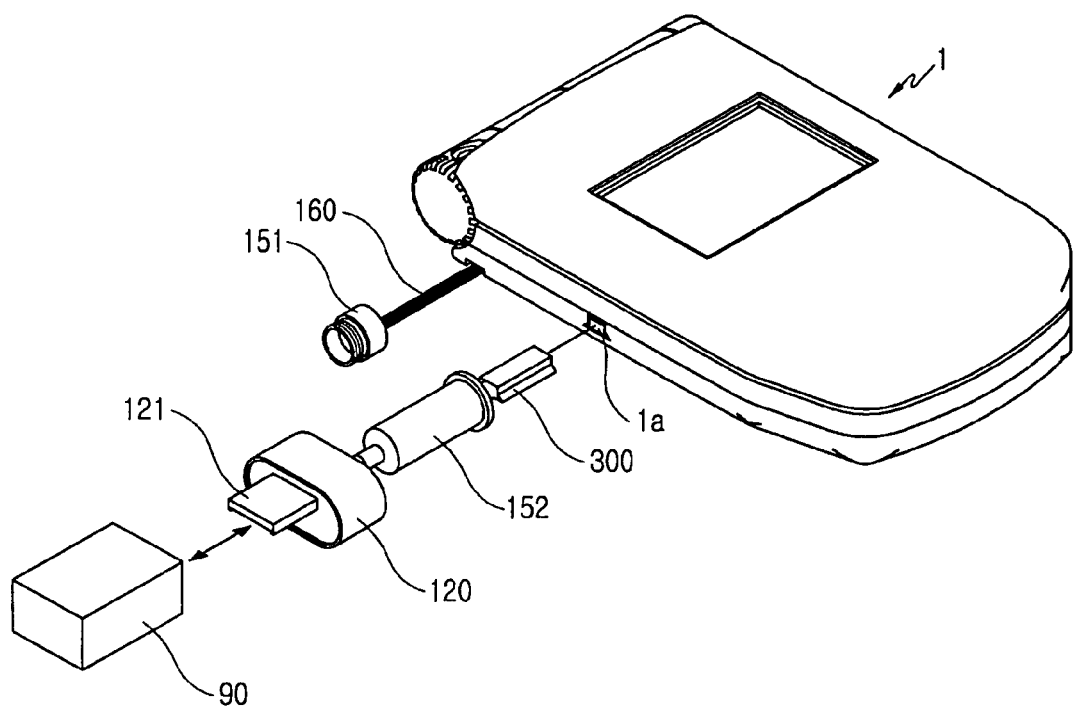
FIG. 18 is a perspective view illustrating the connector assembly arranged to connect a mobile phone to a peripheral device according to the third embodiment of the present invention.

As illustrated in FIG. 18, the interface connector terminal 300 can be directly plugged into the interface terminal 1a provided on the mobile phone 1. To connect the connector terminal 120 to the peripheral device 90, a protective cap 310 (FIG. 17) that covers the connector terminal 120 should be removed. In this condition, the USB jack 121 of the connector terminal 120 is connected to the peripheral device 90 (for example, a Bluetooth embedded device, a memory device or a speaker device) as illustrated in FIG. 19.

To terminate the connection between the mobile phone 1 and the peripheral device 90, the USB jack 121 of the connector terminal 120 should be separated from the peripheral device 90. Then the connector terminal 120 is covered by the protective cap 310. The interface connector terminal 300 is separated from the interface terminal 1a of the mobile phone 1. Lastly, the second case 152 is moved up to receive the interface connector terminal 300 therein and then screwed up to the first case 151 to be fixed to the mobile phone 1.

The connector assembly 100 can be used as a hand strap or a decorative accessory for the mobile phone 1.

Hereinafter, the structure of a connector assembly for connecting a mobile phone to a peripheral device according to the fourth embodiment of the present invention will be explained in detail with reference to FIGS. 20 to 22.

Figure 20:
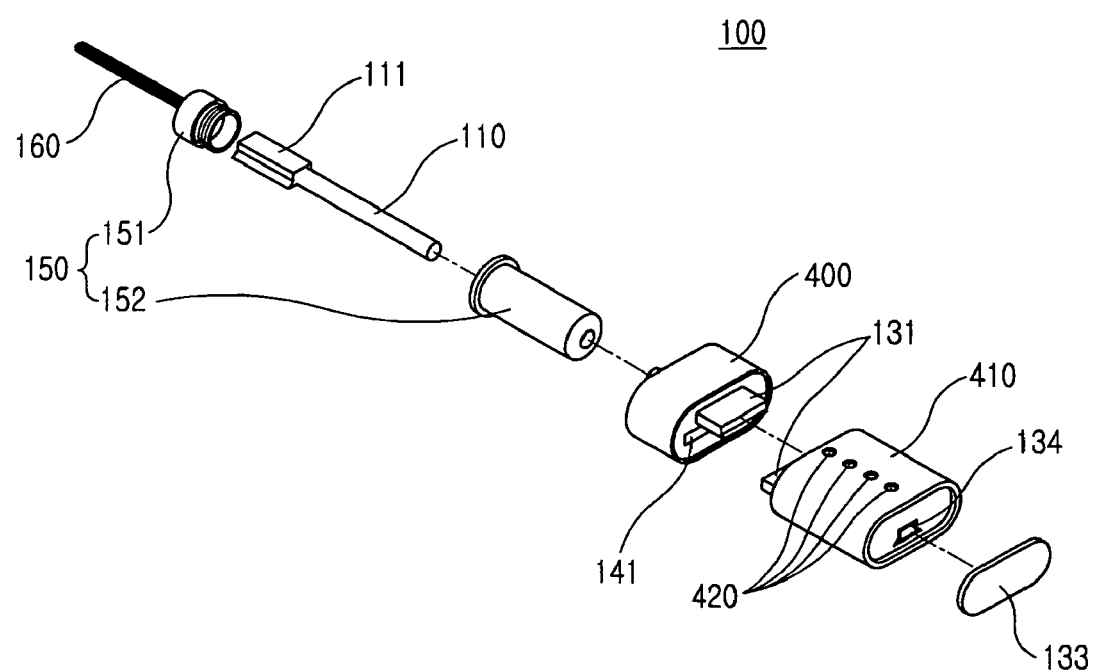
FIG. 20 is an exploded perspective view of a connector assembly according to a fourth embodiment of the present invention.

Referring to FIG. 20, the connector assembly 100 includes a short cable 110, a first connector terminal 400 provided at one end of the cable 110 and having an interface connector 131 which can be connected to an interface terminal 1a of a mobile phone 1, and a second connector terminal 410 having an interface connector 131 which can be connected to an interface terminal 2a (FIG. 22) of another mobile phone 2 (FIG. 22) and a receptacle connector 134 to which a plug connector 111 provided at the other end of the cable 110 can be connected.

The plug connector 111 is received within a protective case 150. The protective case 150 is composed of a first case 151 and a second case 152 screwed to the first case 151.

Figure 21:
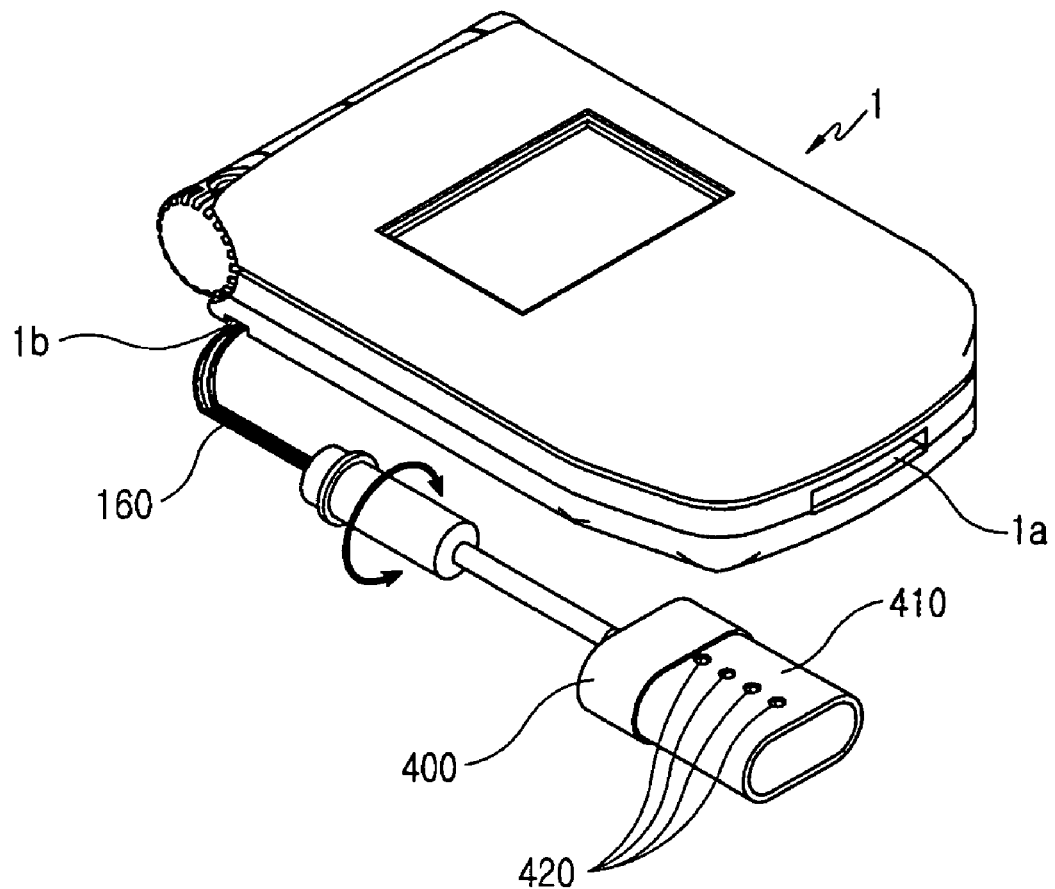
FIG. 21 is a perspective view illustrating the connector assembly hung on a mobile phone according to the fourth embodiment of the present invention.

As illustrated in FIG. 21, the first case 151 of the protective case 150 is fixed to a wire strap 160 which can be hung on the loop 1b of the mobile phone 1.

In order to establish a connection between the mobile phones 1 and 2, the second case 152 should be unscrewed and separated from the first case 151. At this time, the first case 151 is still fixed to the mobile phone 1 due to the wire strap 160 hung on the loop 1b. The plug connector 111 can be pulled out from the receiving space of the second case 152.

The second connector terminal 410 is separated from the first connector terminal 400 provided at one end of the cable 110. Due to this separation, the interface connector 131 of the second connector terminal 410 is pulled out from the first slot 141 (FIG. 20) of the first connector terminal 400. At the same time, the interface connector 131 of the first connector terminal 400 is pulled out from the second slot 142 (not shown) of the second connector terminal 410.

Figure 22:
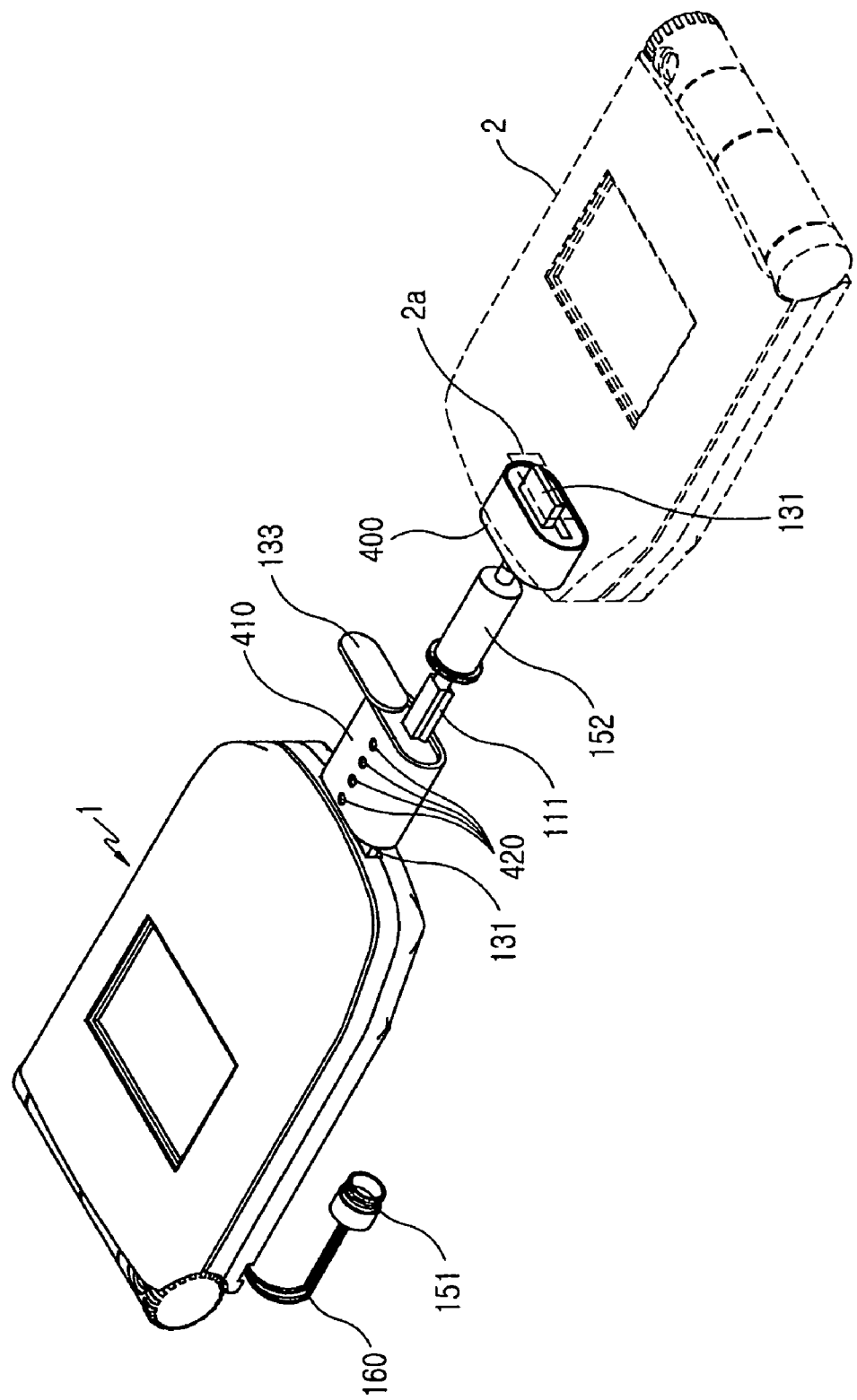
FIG. 22 is a perspective view illustrating the connection between two mobile phones using the connector assembly according to the fourth embodiment of the present invention.

As illustrated in FIG. 22, a cover 133 provided at the bottom of the second connector terminal 410 is removed to open the receptacle connector 134 of the second connector terminal 410.

The plug connector 111 is electrically connected to the receptacle connector 134 of the second connector terminal 410. Then, the interface connector 131 of the second connector terminal 410 is plugged into the interface terminal 1a of the mobile phone 1.

The interface connector 131 of the first connector terminal 400 can be plugged into the interface terminal 2a of another mobile phone 2.

As illustrated in FIG. 22, the two mobile phones 1 and 2 are electrically connected through the first and second connector terminals 400 and 410. The power left in the battery pack (not shown) in the mobile phone 1 can be transferred to charge the battery pack of the mobile phone 2.

Thus, when a mobile phone 1 has a fully-charged battery pack (not shown), it can be used to charge a battery pack (not shown) of another mobile phone 2 with a much lower power level.

The second connector terminal 410 has a plurality of light-emitting diode (LED) lamps 420 that illuminate according to the battery charging time. The number of illuminating LED lamps 420 tells how much power remains in the battery pack of the mobile phone 1.

Hereinafter, the structure of a connector assembly for connecting a mobile phone to a peripheral device according to the fifth embodiment of the present invention will be explained in detail with reference to FIGS. 23 to 25.

Figure 23:
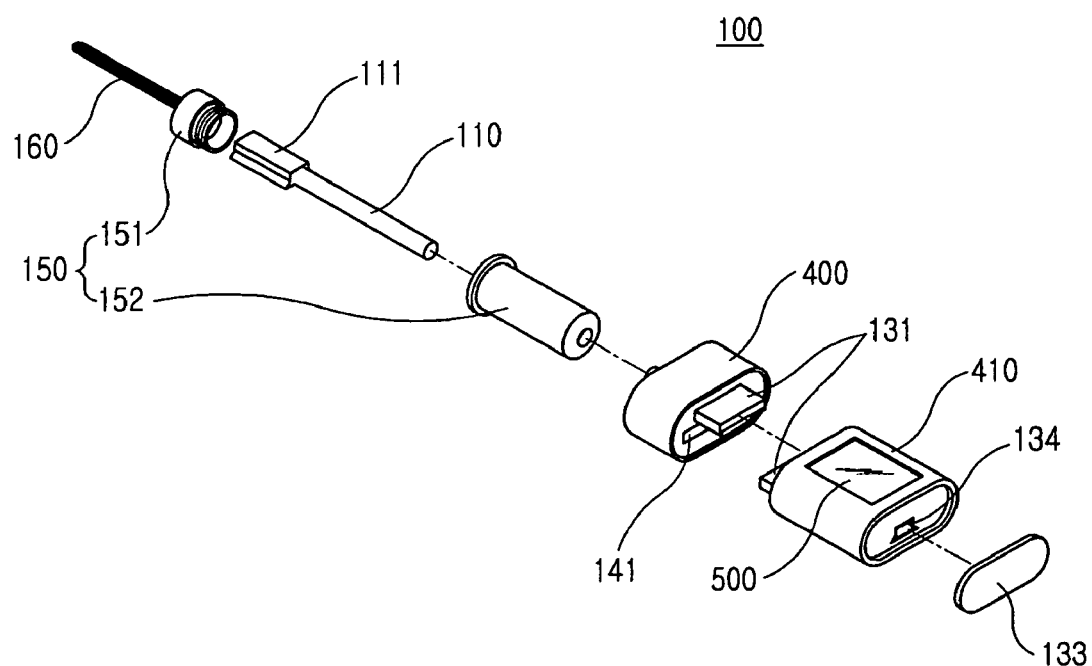
FIG. 23 is an exploded perspective view of a connector assembly according to a fifth embodiment of the present invention.

Referring to FIG. 23, the connector assembly 100 includes a short cable 110, a first connector terminal 400 provided at one end of the cable 110 and having an interface connector 131 which can be connected to an interface terminal 1a of a mobile phone 1, and a second connector terminal 410 having an interface connector 131 which can be connected to an interface terminal 2a of another mobile phone 2 and a receptacle connector 134 to which a plug connector 111 provided at the other end of the cable 110 can be connected.

The plug connector 111 is received within a protective case 150. The protective case 150 is composed of a first case 151 and a second case 152 screwed to the first case 151.

Figure 24:
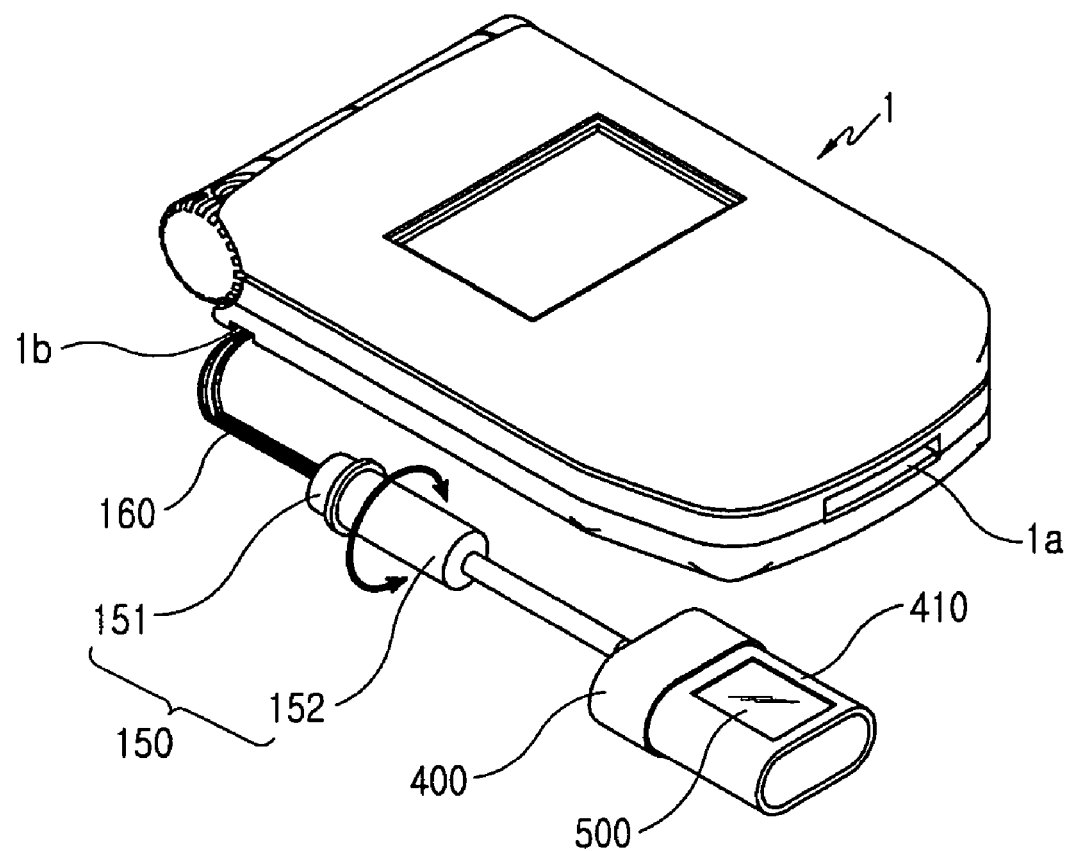
FIG. 24 is a perspective view illustrating the connector assembly hung on a mobile phone according to the fifth embodiment of the present invention.

As illustrated in FIG. 24, the first case 151 of the protective case 150 is fixed to a wire strap 160 which can be hung on the loop 1b of the mobile phone 1. In order to establish a connection between the mobile phones 1 and 2, the second case 152 is unscrewed and separated from the first case 151. At this time, the first case 151 is still fixed to the mobile phone 1 due to the wire strap 160 hung on the loop 1b. The plug connector 111 can be pulled out from the receiving space of the second case 152.

The second connector terminal 410 is separated from the first connector terminal 400 provided at one end of the cable 110. Due to this separation, the interface connector 131 of the second connector terminal 410 is pulled out from the first slot 141 of the first connector terminal 400. At the same time, the interface connector 131 of the first connector terminal 400 is pulled out from the second slot 142 (not shown) of the second connector terminal 410.

Figure 25:
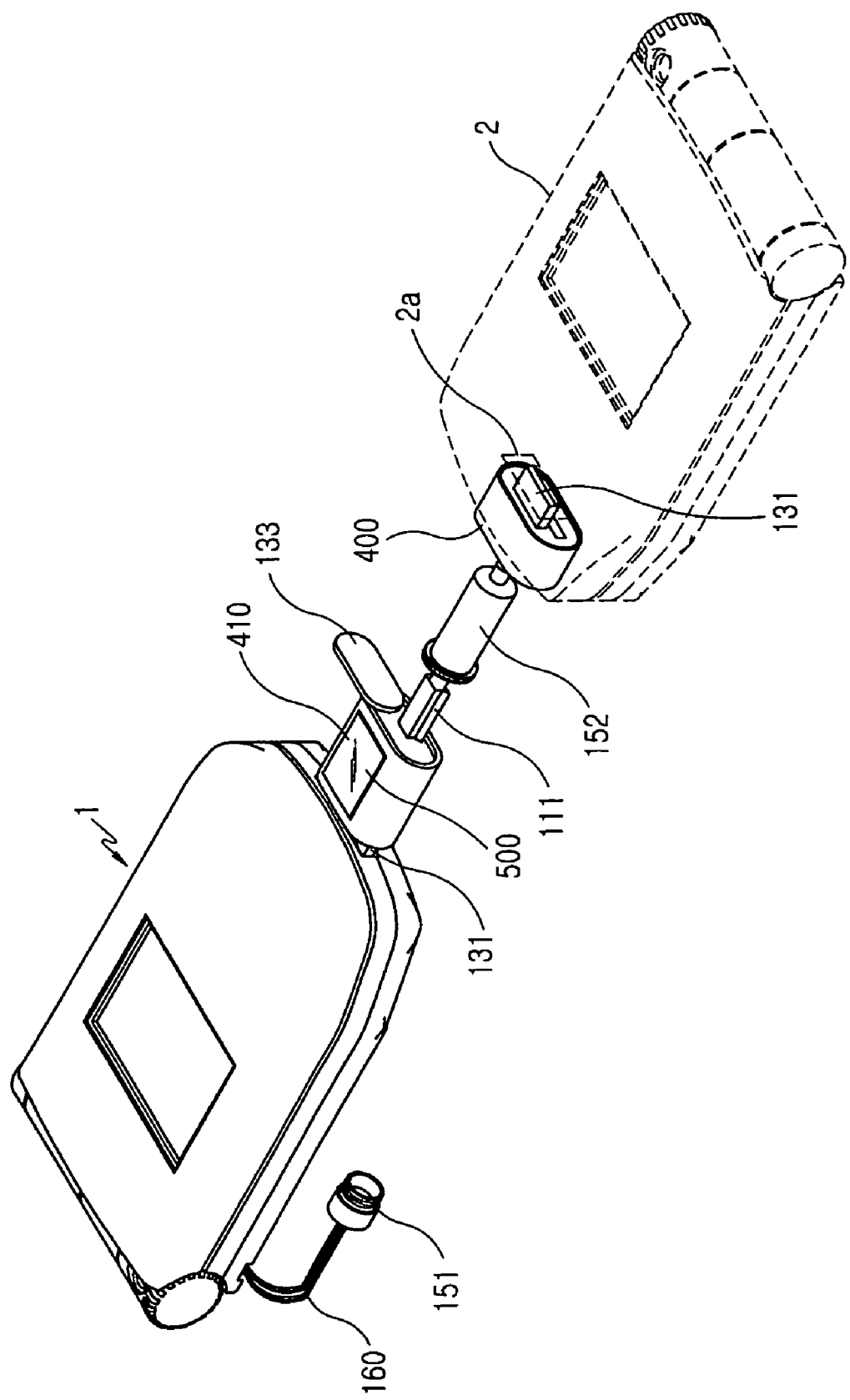
FIG. 25 is a perspective view illustrating the connection between two mobile phones using the connector assembly according to the fifth embodiment of the present invention.

As illustrated in FIG. 25, a cover 133 provided at the bottom of the second connector terminal 410 is removed to open the receptacle connector 134 of the second connector terminal 410.

The plug connector 111 is electrically connected to the receptacle connector 134 of the second connector terminal 410. Then, the interface connector 131 of the second connector terminal 410 is plugged into the interface terminal 1a of the mobile phone 1. The interface connector 131 of the first connector terminal 400 can be plugged into the interface terminal 2a of another mobile phone 2.

As illustrated in FIG. 22, the two mobile phones 1 and 2 are electrically connected through the first and second connector terminals 400 and 410. The power left in the battery pack (not shown) in the mobile phone 1 can be transferred to charge the battery pack of the mobile phone 2.

Thus, when a mobile phone 1 has a fully-charged battery pack (not shown), it can be used to charge a battery pack (not shown) of another mobile phone 2 with a much lower power level.

As illustrated in FIG. 25, the second connector terminal 410 has a display unit 500 for displaying the charge amount (power transferred from the first mobile phone 1 to the second mobile phone 2). The displayed charge amount tells how much power remains in the battery pack of the first mobile phone 1 or is transferred to charge the battery pack of the second mobile phone 2.

The display unit 500 comprises an LCD. The LCD display unit 500 displays the charge amount expressed in a unit of time ("minute") or rate ("%") so that a user can charge a nearly-empty battery pack as fully as possible and thereby prevent data loss (cut-off of a call, mobile game or e-payment) caused by the sudden power-off from a low battery condition. Therefore, a mobile phone can be used at the optimum charge state.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A connector assembly for connecting a mobile phone to a peripheral device, which comprises:
   a cable;
   a first connector terminal provided at one end of the cable to be connected to the peripheral device; and
   a second connector terminal detachable from the first connector terminal, electrically connected to a plug connector provided at the other end of the cable and having an interface connector that can be plugged into an interface terminal provided on the mobile phone.

2. The connector assembly as claimed in claim 1, wherein the cable has a length which reduces the distance between the first and second connector terminals when arranged to connect the mobile phone to the peripheral device.

3. The connector assembly as claimed in claim 1, further comprising a connection means for securing the second connector terminal to the first connector terminal.

4. The connector assembly as claimed in claim 3, wherein the connection means includes:
   a first slot formed on the first connector terminal to secure the interface connector of the second connector terminal inserted therein;
   a second slot formed on the second connector terminal to secure a Universal Serial Bus (USB) jack of the first connector terminal inserted therein according to the insertion of the interface connector of the second connector terminal into the first slot.

5. The connector assembly as claimed in claim 1, wherein the interface connector is a 24-pin connector.

6. The connector assembly as claimed in claim 1, wherein the plug connector is a 10-pin connector.

7. The connector assembly as claimed in claim 1, wherein the second connector terminal having the interface connector at one end thereof has a receptacle connector to which the plug connector of the cable can be electrically connected.

8. The connector assembly as claimed in claim 1, wherein the first connector terminal has a Universal Serial Bus (USB) jack which can be connected to the peripheral device.

9. The connector assembly as claimed in claim 1, wherein the plug connector is covered and protected by a protective case consisting of a first case and a second case screwed onto the first case and fixed to a wire strap which can be hung on a loop provided on the mobile phone.

10. The connector assembly as claimed in claim 9, wherein the loop serves as a hand strap for the mobile phone.

11. The connector assembly as claimed in claim 9, wherein the connection between the mobile phone and the peripheral device is established by unscrewing and separating the second case of the protective case from the first case fixed to the wire strap hung on the loop of the mobile phone, taking out the plug connector received within the second case, separating the second connector terminal from the first connector terminal, electrically connecting the plug connector to the receptacle connector provided at the bottom of the second connector terminal, and inserting the interface connector of the second connector terminal into the interface terminal provided on the mobile phone.

12. A connector assembly for connecting a mobile phone to a peripheral device, which comprises:
- a cable;
- a first connector terminal provided at one end of the cable to be connected to the peripheral device;
- a second connector terminal detachable from the first connector terminal, electrically connected to a plug connector provided at the other end of the cable and having an interface connector that can be plugged into an interface terminal provided on the mobile phone; and
- a locking means for locking the second connector terminal to the first connector terminal.

13. The connector assembly as claimed in claim 12, wherein the locking means includes:
- a pair of locking recesses formed on the inside of the second connector terminal; and
- a pair of lockers provided in the first connector terminal to be inserted into the locking recesses and released out from the locking recesses with the pressing of a pair of buttons extending outward.

14. The connector assembly as claimed in claim 13, wherein each of said lockers includes:
- a button extending outwardly from a side of the first connector terminal;
- a locking projection formed at a lower part of the locker to be inserted into the corresponding locking recess and released out from the locking recess with the pressing of the button; and
- an elastic member mounted on a rear side of the button to generate an elastic force acting to secure the locking projection in the locking recess.

15. The connector assembly as claimed in claim 12, wherein the second connector terminal further includes a sliding cover for closing and opening a receptacle connector according to the necessity of electrical connection between the plug connector and the receptacle connector.

16. The connector assembly as claimed in claim 15, wherein the sliding cover includes a pair of guide members formed at side edges thereof and inserted into a pair of guide grooves linearly formed at the side edges of a bottom of the second connector terminal to be slidable back and forth on the guide grooves.

17. A connector assembly for connecting a mobile phone to a peripheral device, which comprises:
- a first connector terminal connected to the peripheral device; and
- a second connector terminal detachable from the first connector terminal, electrically connected to a cable extending from the first connector terminal and having an interface connector that can be plugged into an interface terminal provided on the mobile phone.

* * * * *